(12) United States Patent
Matsuyama et al.

(10) Patent No.: US 6,300,996 B1
(45) Date of Patent: Oct. 9, 2001

(54) LIQUID CRYSTAL DISPLAY APPARATUS

(75) Inventors: Hiroaki Matsuyama; Kazumi Kobayashi; Yoshihiko Hirai; Toshiya Ishii; Hideya Murai; Masayoshi Suzuki, all of Tokyo (JP)

(73) Assignee: NEC Coporation, Tokyo (JP)

( * ) Notice: Subject to any disclaimer, the term of this patent is extended or adjusted under 35 U.S.C. 154(b) by 0 days.

(21) Appl. No.: 09/321,454

(22) Filed: May 27, 1999

(30) Foreign Application Priority Data

Jun. 1, 1998 (JP) .................................................. 10-150821

(51) Int. Cl.⁷ .................................................. G02F 1/1343
(52) U.S. Cl. .............................. 349/144; 349/143; 349/43
(58) Field of Search ............................... 349/144, 39, 43, 349/138, 143

(56) References Cited

U.S. PATENT DOCUMENTS

| | | | |
|---|---|---|---|
| 5,309,264 | * 5/1994 | Lien et al. | 349/143 |
| 5,608,556 | * 3/1997 | Koma | 349/143 |
| 5,777,700 | * 7/1998 | Kaneko et al. | 349/39 |
| 6,016,174 | * 1/2000 | Endo et al. | 349/43 |
| 6,040,882 | * 3/2000 | Jun et al. | 349/39 |
| 6,081,315 | * 6/2000 | Matsuyama et al. | 349/143 |
| 6,157,428 | * 12/2000 | Koma | 349/138 |
| 6,229,589 | * 5/2001 | Koma | 349/139 |

FOREIGN PATENT DOCUMENTS

| | | |
|---|---|---|
| 4-223436 | 8/1992 | (JP) . |
| 8-76125 | 3/1996 | (JP) . |
| 10-20323 | 1/1998 | (JP) . |

* cited by examiner

Primary Examiner—William L. Sikes
Assistant Examiner—Julie Ngo
(74) Attorney, Agent, or Firm—Hutchins, Wheeler & Dittmar

(57) ABSTRACT

A liquid crystal display device can suppress pixel-based gradation fluctuations observed upon change in angle of view with increased size as it meets wide angle of view characteristics required of a large-sized liquid crystal display device. A device in which a liquid crystal material is sealed between a pair of substrates 31, 32, a plurality of pixel electrodes 38 for applying voltage across the liquid crystal material is arranged on the substrate 31, a common electrode 12 for applying a voltage common to the pixel electrodes 38 is arranged on the substrate 32, and in which a gate line 22 and a drain line 23 of a switching element adapted to control the voltage applied across the pixel electrodes 38 are provided for extending substantially at right angles to each other. In the device, orientation of the liquid crystal molecules 18 neighboring to the pixel electrode 38 is perpendicular to that of liquid crystal molecules 19 neighboring to the common electrode 12, while the respective orientations are substantially parallel to the direction of the gate line 22 or that of the drain line 23.

8 Claims, 10 Drawing Sheets

LIQUID CRYSTAL DISPLAY APPARATUS

FIELD OF THE INVENTION

The present invention relates to a liquid crystal display device. More particularly, it relates to a liquid crystal display device in which it is possible to improve orientation characteristics of a liquid crystal material sealed in a space between a pair of substrates facing each other.

DESCRIPTION OF THE RELATED ART

In a conventional liquid crystal display device, a twisted nematic system is widely used. This system has a drawback that the direction of orientation of liquid crystal molecules of an intermediate layer of the liquid crystal layers at the time of voltage application is uniform in a pixel such that the color tone becomes different depending on different angles of view. As means for improving this viewing angle characteristics, there is known an orientation split type liquid crystal display device. In this type of the liquid crystal display device, each pixel is split into plural regions and the direction of orientation of liquid crystal molecules in the intermediate layer in each region is caused to differ to effect compensation of the viewing angle characteristics of the respective regions one another to realize wide viewing angle characteristics.

JP Patent Kokai JP-A-4-223436 discloses a liquid crystal display wherein orientation processing is applied to a TFT substrate so as to align the liquid crystal molecules along either gate lines or drain lines in order to suppress disclination of the liquid crystal molecules. The gate lines are disposed in right angles to the drain angles.

A liquid crystal display device of the orientation splitting type is described in JP Patent Kokai JP-A-10-20323. FIG. 10 shows a cross-sectional side view of essential portions of the liquid crystal display device described in this publication. This liquid crystal display device includes a plurality of gate line 22 and a plurality of drain line 23, extending in the row and column directions on a substrate 31, respectively, as shown in FIG. 7. In each intersection of the gate line 22 and the drain line 23, there are arranged a switching device, made up of a gate electrode 33, a gate insulating film 34, a semiconductor layer 35, a drain electrode 36 and a source electrode 37, and a pixel electrode 38 electrically connected to the source electrode 37 to apply a voltage across the liquid crystal material. The voltage applied across the pixel electrode 38 is controlled by the switching device. The pixel electrode 38 is provided with an opening (slit) 39 operating as the boundary of the orientation-split region. A control electrode 11 is disposed as an underlayer for the opening 39. On the opposite side, there is provided a substrate 32 on which is arranged a common electrode 12 for applying a common voltage across each pixel electrode 38. There is no necessity of providing the common electrode 12 with an opening. As uppermost layers of the substrates 31, 32, there are formed orientation films 13, 14, respectively, for retaining a liquid crystal molecule 15 sandwiched in-between.

If a voltage is applied across the control electrode 11, there is generated an obliquely extending electrical field ranging from an end of the opening 39 to an end of the pixel electrode 38. The liquid crystal molecule 15 is split in orientation by oblique electrical fields of different orientations produced with the opening 39 as a boundary.

FIG. 10 shows the direction of orientation of the liquid crystal molecule 15 mainly present in a mid layer of the liquid crystal layer. By illumination of UV rays, a minor amount of a UV curable monomer or oligomer previously mixed into a liquid crystal material is polymerized to a polymer 16. The polymer 16 follows the direction of orientation of the liquid crystal molecule at the time of illumination of the UV rays and is fixed in its configuration when the voltage ceases to be applied across the control electrode 11. Also, since the polymer 16 is present in a minor amount, the liquid crystal molecule is controlled only in the rising direction at the time of voltage application and is changed in its gradient corresponding to the applied voltage. Therefore, it is unnecessary to apply the voltage across the control electrode 11 at the time of driving, such that display is possible only by voltage application across the pixel electrode 38.

FIGS. 7 and 8 show the plan views of essential portions of the liquid crystal display device shown in FIG. 10 and the state of splitting of the orientation in the liquid crystal display device of FIG. 7, respectively.

Referring to FIG. 7 by way of example, the opening 39 and the control electrodes 11, arranged as an underlayer below the opening 39, are of a structure in which a pair of oppositely disposed Y letters (Y-bottom being connected to each other) are arranged in an up-and-down direction in the drawing sheet. This splits the pixel electrode 38 in four segmented regions 38A to 38D. If this structure is used in executing the orientation splitting process described above, the splitting configuration shown in FIG. 8 is achieved. If the orientation films 13, 14 are previously processed with orientation processing, such as with rubbing, a liquid crystal molecule 18 on the side of the pixel electrode and a liquid crystal molecule 19 on the side of the control electrode are oriented at an angle of approximately 45° with respect to the gate lines 22 and the drain lines 23 extending in the orthogonal directions shown in FIG. 7. The directions of orientation of the liquid crystal molecules 18, 19 are set so as to be substantially perpendicular to each other. Since the rising direction of the liquid crystal molecule 20 of each intermediate layer present in each of the split four regions 38A to 38D differ from one another, the viewing angle characteristics compensate one another, thus realizing wide viewing angle characteristics.

SUMMARY OF THE DISCLOSURE

However, the following problems have been encountered in the course of the investigations toward the present invention. Namely, the above-described orientation splitting type liquid crystal display device has a drawback that minute domains with different directions of orientation tend to be produced in each of the split regions. FIG. 9 shows a plan view of the defective orientation domains in the above-described conventional liquid crystal display device. The reason of generation of the defective orientation domains 28 resides in the transverse electrical field generated from the gate lines 22 and the drain lines 23 (FIG. 7). The directions of the transverse electrical fields Ef1, Ef2 from the respective lines 22, 23 are perpendicular to the extending directions A, B of the lines 22, 23. By these transverse electrical fields, the direction of orientation of the intermediate layer of the liquid crystal molecule 20 is forced to be parallel to the direction of the transverse electrical fields Ef1, Ef2, respectively.

Thus, during display driving, with the voltage being applied across the pixel electrode 38, the liquid crystal molecules 20 of the intermediate layer are forced to be substantially perpendicular to the drain lines 23, under the effect of the transverse electrical field Ef2 from the drain lines 23 (FIG. 7), as shown in FIG. 9, so that there are produced domains of defective orientation 28 having the distorted orientation different from that in other regions. If the domains of defective orientation 28 are produced, the area ratio of the respective regions obtained on orientation splitting (splitting ratio) is partialized (inbalanced) to certain part of the entire regions thus giving rise to fluctuations in the pixel-wise gradation observed mainly on changing the angle of view insofar as the display is concerned.

There is disclosed in JP Patent Kokai JP-A-8-76125 an orientation splitting type liquid crystal display device having an opening (slit) in a common electrode. This liquid crystal display device has many drawbacks, such that, since an opening is provided in the common electrode, a photoresist process is required on the side of the counter (opposing) substrate, thus increasing the load on the manufacturing process, and that, although there is no necessity of executing orientation processing, such as rubbing, a photoresist process for groove patterning is necessitated instead.

It is an object of the present invention to provide a liquid crystal display device in which pixel-based fluctuations in the gradation, observed mainly on changing the angle of view, can be suppressed and which can be designed as a large-sized display device for which wide viewing angle characteristics are required.

It is another object of the present invention to provide a liquid crystal display device which enables the load on the manufacturing process to be eased.

For accomplishing the above object, the present invention provides a liquid crystal display device in which a liquid crystal material is sealed between a pair of substrates, a plurality of pixel electrodes for applying a voltage across the liquid crystal material is disposed on one of the substrates, a common electrode for applying a common voltage across the liquid crystal material opposing the pixel electrodes is disposed on the other substrate, and in which gate lines and drain lines of switching elements adapted to control the voltage to be applied across the pixel electrodes are provided extending substantially at right angles to each other. The orientation of the liquid crystal molecules neighboring to the pixel electrode is perpendicular to that of liquid crystal molecules neighboring to the common electrode, and the either of said orientations is substantially parallel to the extending direction of the gate line or that of the drain line.

Preferably, pixel electrode is substantially in the form of a rectangle having a side substantially parallel to the gate lines and the other side substantially parallel to the drain lines. The pixel electrode has a first opening (slit) extending substantially parallel to the gate line for splitting the pixel electrode in two with respect to the direction of extension of the drain line and second and third openings (slits) extending from the vicinity of an end of the first opening opposite to the drain line at a pre-set inclination (angle) towards the drain line for further splitting each of the two split regions into two.

By generating oblique electrical fields with the second and third openings as boundaries, the direction of orientation of liquid crystal molecules can be split in an optimum state, such that, by polymerizing a minor amount of the UV curable monomer or oligomer to the liquid crystal material, the direction of orientation can be fixed to provide a wide viewing angle display.

Alternatively, a pixel electrode is substantially in the form of a rectangle having a side substantially parallel to the gate lines and the other side substantially parallel to the drain lines. The pixel electrode has a first opening extending substantially parallel to the gate line for splitting the pixel electrode in two along a direction of extension of the drain line and second and third openings extending from the vicinity of an end of the first opening towards the drain line at a pre-set inclination in a direction away from the drain line for further splitting each of the two split regions into two.

In this manner, oblique electrical fields having different directions are generated, with the second and third openings as the boundary, to split the direction of orientation of the liquid crystal molecules in an optimum state. A minor amount of resin(s) added to the liquid crystal material is polymerized to fix the direction of orientation to provide a wide viewing angle characteristics.

Preferably, there is provided an electrically conductive portion in an area where the ends of the first to third openings are close to one another, the electrically conductive portion electrically connecting the respective regions split by the openings (slits) to one another. This assures electrical conduction across respective regions by the electrically conductive potion of a simplified structure.

Preferably, there is also provided a control electrode extending (and underlying) along each of the second and third openings. In this case, oblique electrical fields having different directions with the second and third openings as the boundaries may be generated satisfactorily to split the direction of orientation of the liquid crystal molecules in an optimum state.

Preferably, pixel electrode is substantially in the form of a rectangle having a side substantially parallel to the gate lines and the other side substantially parallel to the drain lines. The pixel electrode has a first opening extending substantially parallel to the gate line for splitting the pixel electrode in two along a direction of extension of the drain line and a second opening extending from a mid portion of the first opening for further splitting each of the two split regions in two with respect to the direction of extension of the gate line.

In this case, oblique electrical fields having different directions are generated, with the second and third openings as the boundary, to split the direction of orientation of the liquid crystal molecules in an optimum state. A minor amount of UV curable monomers or oligomers added to the liquid crystal material are polymerized to fix the direction of orientation to provide a wide angle of view characteristics.

Preferably, there is provided an electrically conductive portion at a point of intersection of the first and second openings, with the electrically conductive portion electrically connecting the regions split by the openings to one another.

More preferably, a control electrode is further provided for extending (and underlying) along the first and second openings. If, in this case, a pre-set voltage is applied across the control electrode, optimum orientation splitting can be realized with the first and second openings as the boundary.

Also preferably, the control electrode extending along the first opening has its ends elongated slightly so as to serve simultaneously as an interconnection for a control electrode provided in a neighboring other pixel electrode. Since a process of forming the interconnection can be omitted, it is possible to reduce the load on the manufacturing process correspondingly.

With the liquid crystal display devices according to the present invention, the direction of orientation of liquid crystal molecules can be controlled more stably than in the liquid crystal display device of the conventional technique. Since the orientation splitting ratio of each pixel can be maintained in a more stable state, it is possible to suppress pixel-based gradation fluctuations such as those observed when the angle of view is changed, thus realizing optimum wide viewing angle characteristics.

PREFERRED EMBODIMENTS OF THE INVENTION

Figure 1:
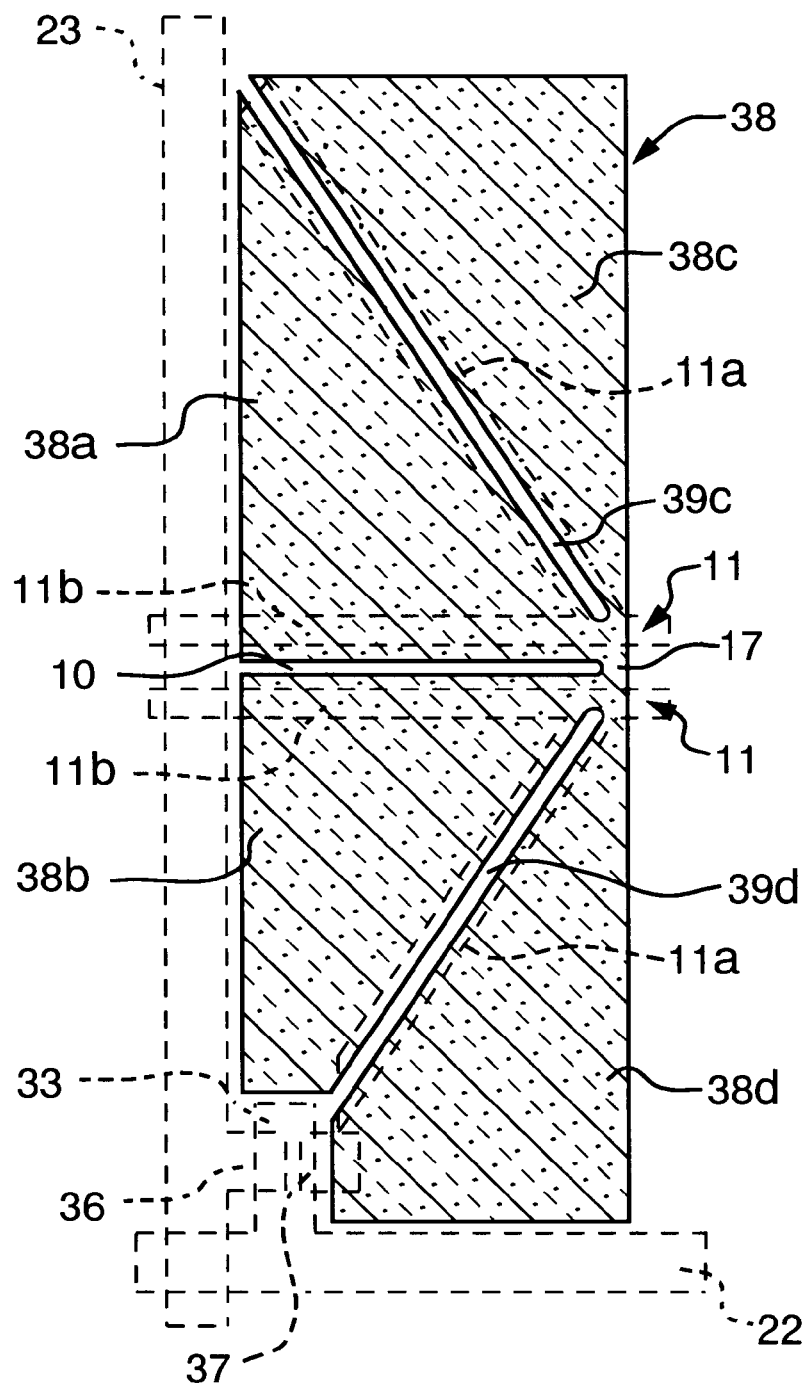
FIG. 1 is a plan view showing essential portions of a liquid crystal display device in the first embodiment and in the first Example of the present invention.
Figure 2:
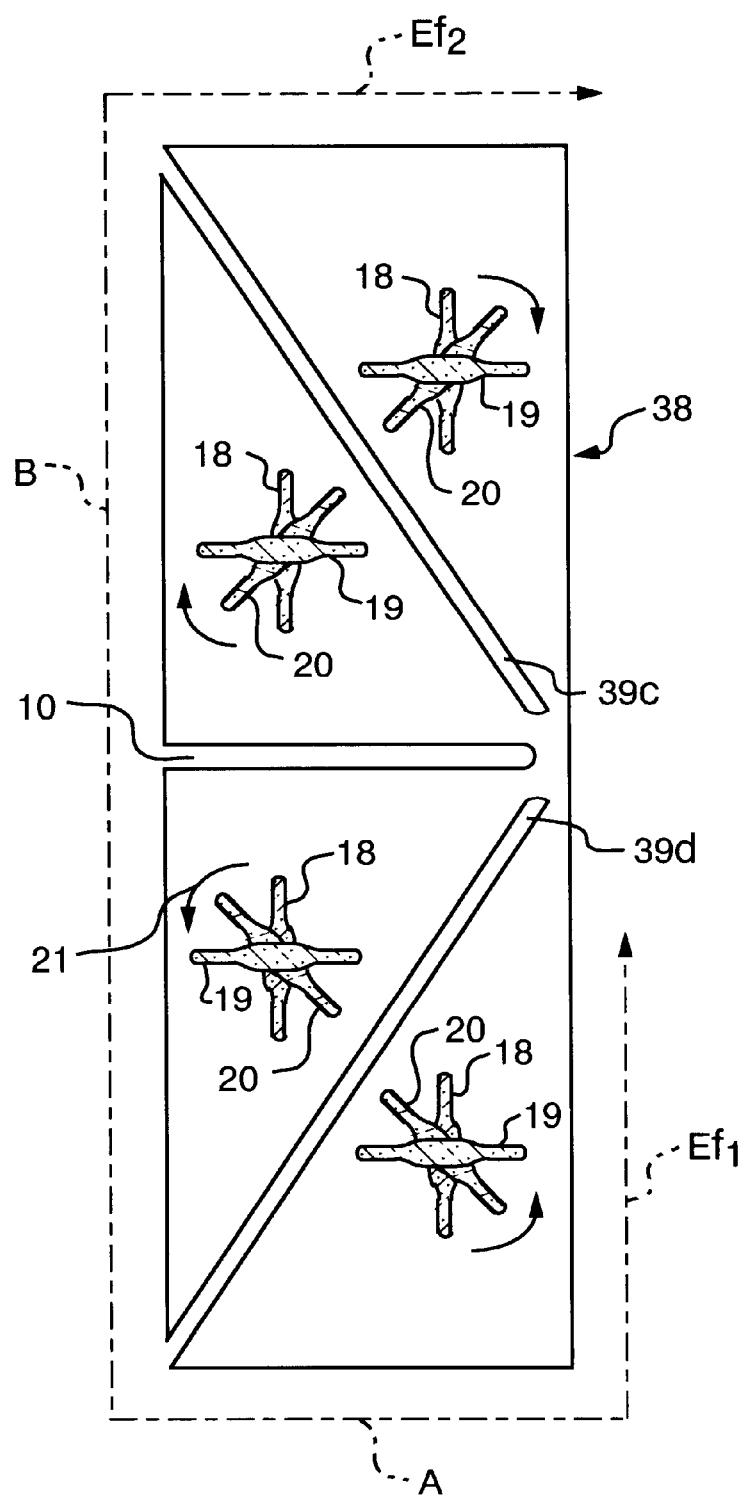
FIG. 2 is a plan view showing the state of orientation splitting of the liquid crystal display device shown in FIG. 1.

Referring to the drawings, preferred embodiments of the present invention will be explained in detail. FIG. 1 is a plan vie showing essential portions of a liquid crystal display device according to a first embodiment of the present invention, and FIG. 2 is a plan view showing the orientation splitting state in the liquid crystal display device in FIG. 1. The basic technology of the orientation splitting in the present embodiment is similar to the technique described in the JP Patent Kokai JP-A-10-20323 explained with reference to FIG. 10.

The liquid crystal display device of the present embodiment differs from the prior-art technology as to the structure of the pixel electrode 38, openings (slits) 39 and 10 and the control electrode 11 shown in FIG. 1, the directions of orientation of the liquid crystal molecules 18 on the side of the pixel electrode, the liquid crystal molecules 19 on the control electrode side and the liquid crystal molecules 20 of the intermediate layer, and as to the arrangement of the orientation splitting resulting from the above-mentioned configuration. The portions which the liquid crystal display device of the present embodiment has in common with the prior-art technique is not specifically explained here.

The liquid crystal display device has plural gate lines 22 and plural drain lines 23 extending in the orthogonal directions (raws and columns) on the substrate, as shown in FIG. 1. At each intersection of the gate line 22 and the drain line 23 are arranged a switching element and a pixel electrode 38. The switching element is made up of a gate electrode 33 electrically connected to the gate line 22, a drain electrode 36 electrically connected to the drain line 23 and a source electrode 37. The pixel electrode 38 is electrically connected to the source electrode 37 and is configured for applying the voltage to the liquid crystal material. The pixel electrode 38 is formed substantially to a rectangular shape and has its short side and long side arrayed parallel to the gate line 22 and the drain line 23, respectively.

The pixel electrode 38 is formed with an opening (first opening or slit) 10 for splitting the pixel electrode 38 in two in the extending direction of the drain line 23, an opening (second opening or slit) 39c and another opening (third opening or slit) 39d extending from the proximity to the end of the opening 10 opposite to the drain line 23 at a pre-set angle towards the drain line 23 for further splitting each of the split regions into two. That is, the opening 10 is extended at a mid portion of the pixel electrode 38 substantially parallel to the gate line 22 for splitting the pixel electrode 38 into two substantially equal regions with respect to the extending direction of the drain line 23, while the openings 39c, 39d are arranged on a diagonal line for further splitting each of the regions split by the opening 10 into two regions. This splits the pixel electrode 38 into four substantially triangular regions 38a to 38d. At an intersection of the openings 10, 39c and 39d is formed an electrically conductive portion 17 for electrically connecting the regions 38a to 38d with one another.

As an underlayer for the pixel electrode 38, there is arranged a control electrode 11 having a control electrode portion 11a and an interconnection portion 11b. The control electrode portion 11a are arranged below the openings 39c and 39d and extended parallel to these openings 39c and 39d. The interconnection portion 11b is extended from the intersection of the openings 10, 39c and 39d in a layer lying below the opening 10 and on both sides of the opening 10 towards the drain line 23 parallel to the opening 10. It is the control electrode portion 11a that operates as the actual control electrode, while the interconnection portion 11b is extended further slightly in the left-and-right direction in FIG. 1 for electrical connection to control electrodes arranged on other pixel electrodes, not shown, neighboring to the interconnection portion 11b in the same direction.

Figure 10:
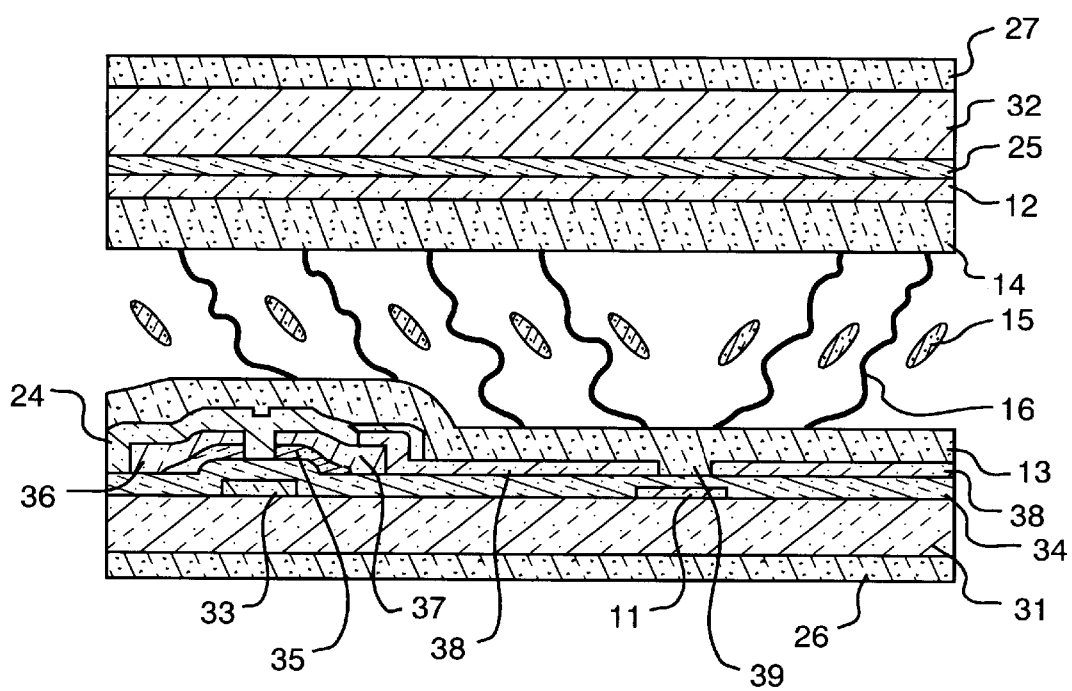
FIG. 10 is a cross-sectional side view showing essential portions of a conventional liquid crystal display device. (Prior Art)

If a pre-set voltage is applied across the control electrode 11, there is realized the orientation splitting, with the openings 39c, 39d as the boundaries, as shown in FIG. 10. Since the interconnection portion 11b is not operating as a control electrode in the boundary portion and in the vicinity of the opening 10, the direction of orientation of the liquid crystal molecule is inclined in the same direction of inclination as the peripheral end of the pixel electrode 38, that is in the opposite direction to the direction of inclination at the respective boundaries of the openings 39c, 39d. The opening 10, with different directions of inclination on both sides thereof, serves as the boundary of the orientation-split regions.

The direction of orientation of the liquid crystal molecules 18 neighboring to the pixel electrode 38 and that of the liquid crystal molecules neighboring to the common electrode 12 are forced and controlled to be substantially perpendicular or parallel to the directions of the transverse electrical fields Ef1, Ef2 (FIG. 10) by previous orientation-processing of the orientation films 13, 14 such as by rubbing, as shown in FIG. 2. This sets the orientation of the liquid crystal molecules 18 on the pixel electrode side and that of the liquid crystal molecules 19 on the common electrode side so as to be either substantially perpendicular or parallel to the gate line 22 or the drain line 23 of the switching element, while setting the direction of orientation of the liquid crystal molecules 18 and that of the liquid crystal molecules 19 so as to be substantially perpendicular to each other.

Figure 3:
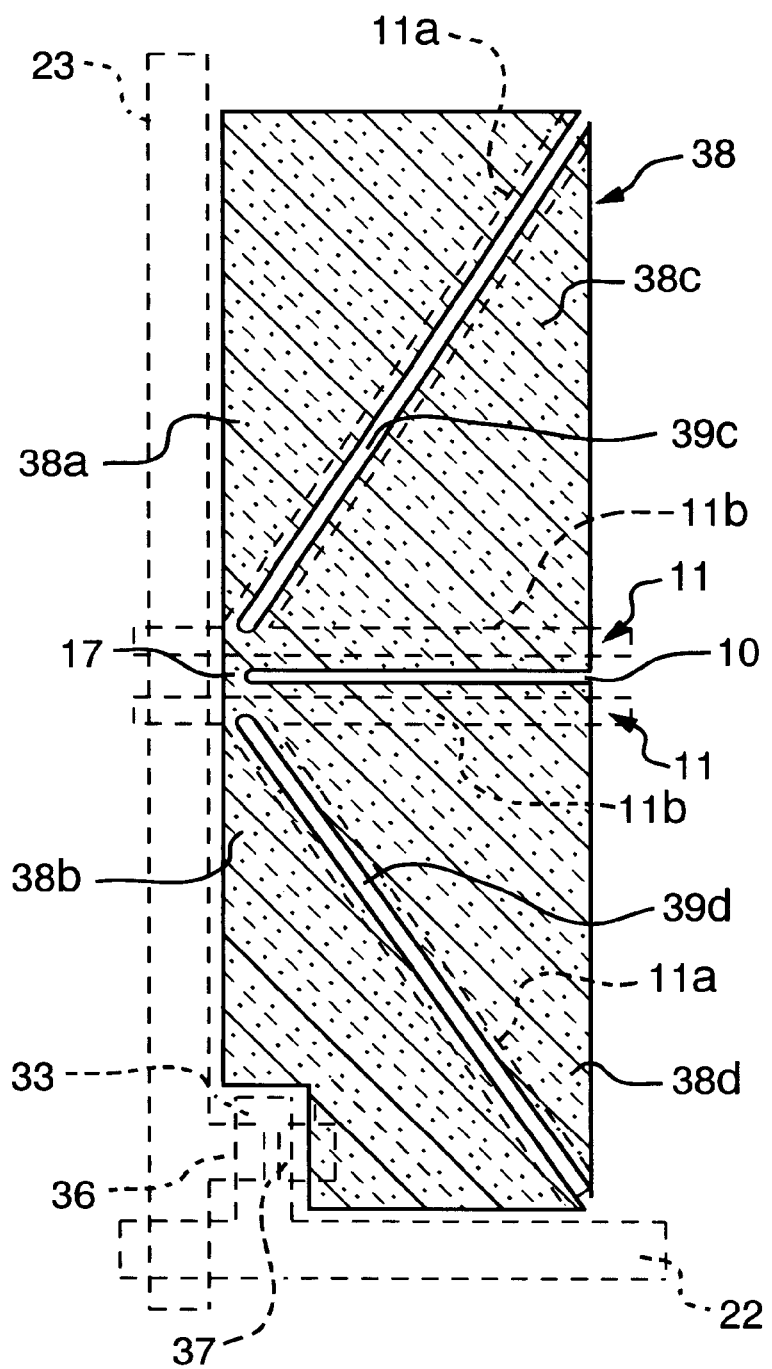
FIG. 3 is a plan view showing essential portions of a liquid crystal display device in the second embodiment of the present invention.

FIG. 3 is a plan view showing essential portions of the liquid crystal display device according to a second embodiment of the present invention. The basic technology of the orientation splitting in the present embodiment is also similar to the technology explained with reference to FIG. 10.

In the present embodiment, the pixel electrode 38 is formed with an opening (first opening or slit) 10 extending substantially parallel to the gate line 22 for splitting the pixel electrode 38 in two in the extending direction of the drain line 23, an opening (second opening or slit) 39c and another opening (third opening or slit) 39d extending from near the end of the opening 10 towards the drain line 23 at a pre-set angle in a direction away from the drain line 23 for further splitting each of the split regions into two. That is, the four regions 38a to 38d in the pixel electrode 38 are substantially line-symmetrical with respect to the respective shapes of the four regions 38a to 38d in the first embodiment, as a result of which the electrically conductive portion 17 lies on the opposite side to the electrically conductive portion 17 in the first embodiment. The present second embodiment gives about the same results as those of the first embodiment.

Figure 4:
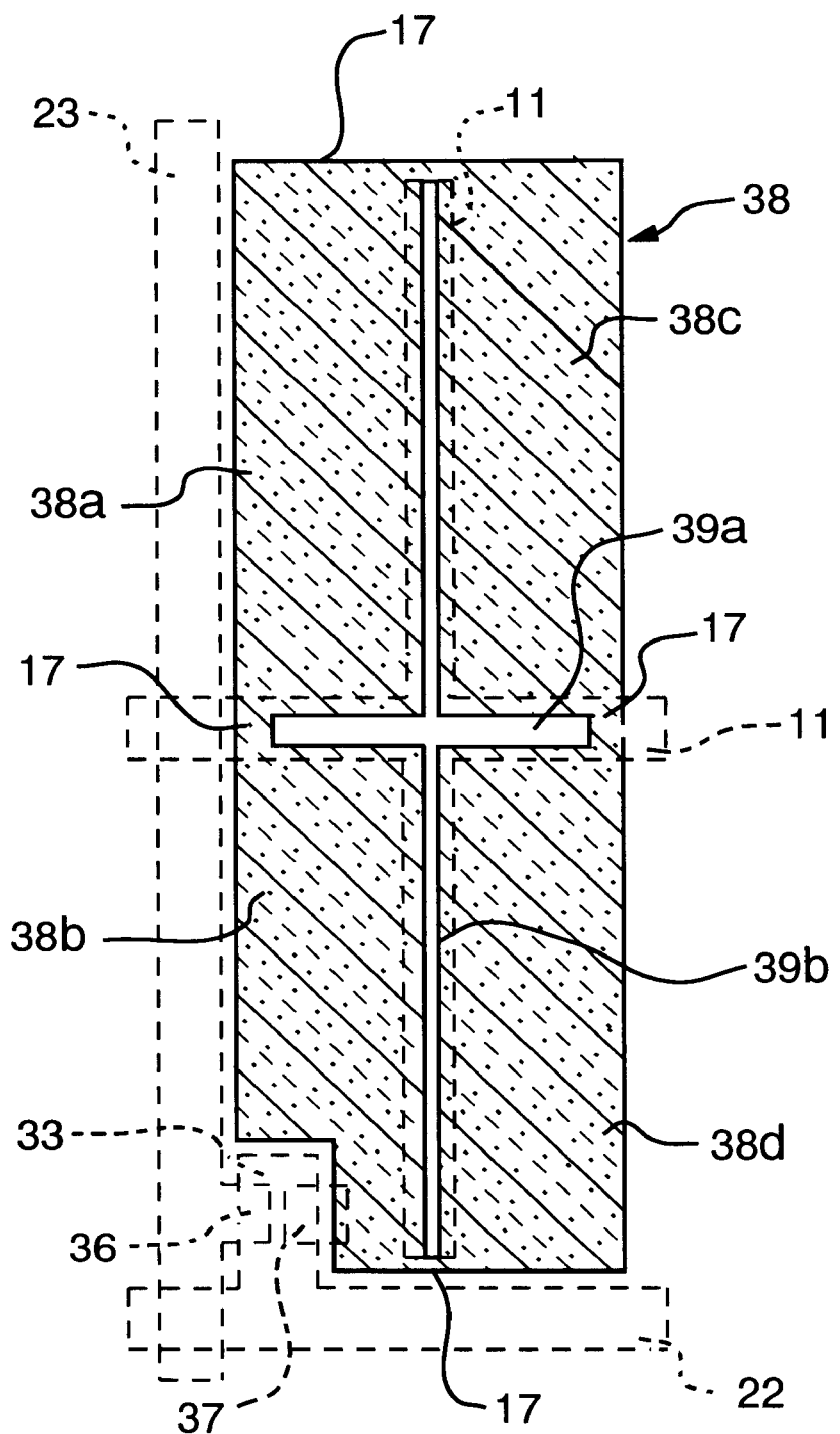
FIG. 4 is a plan view showing essential portions of a liquid crystal display device in the third embodiment and in the second Example of the present invention.
Figure 5:
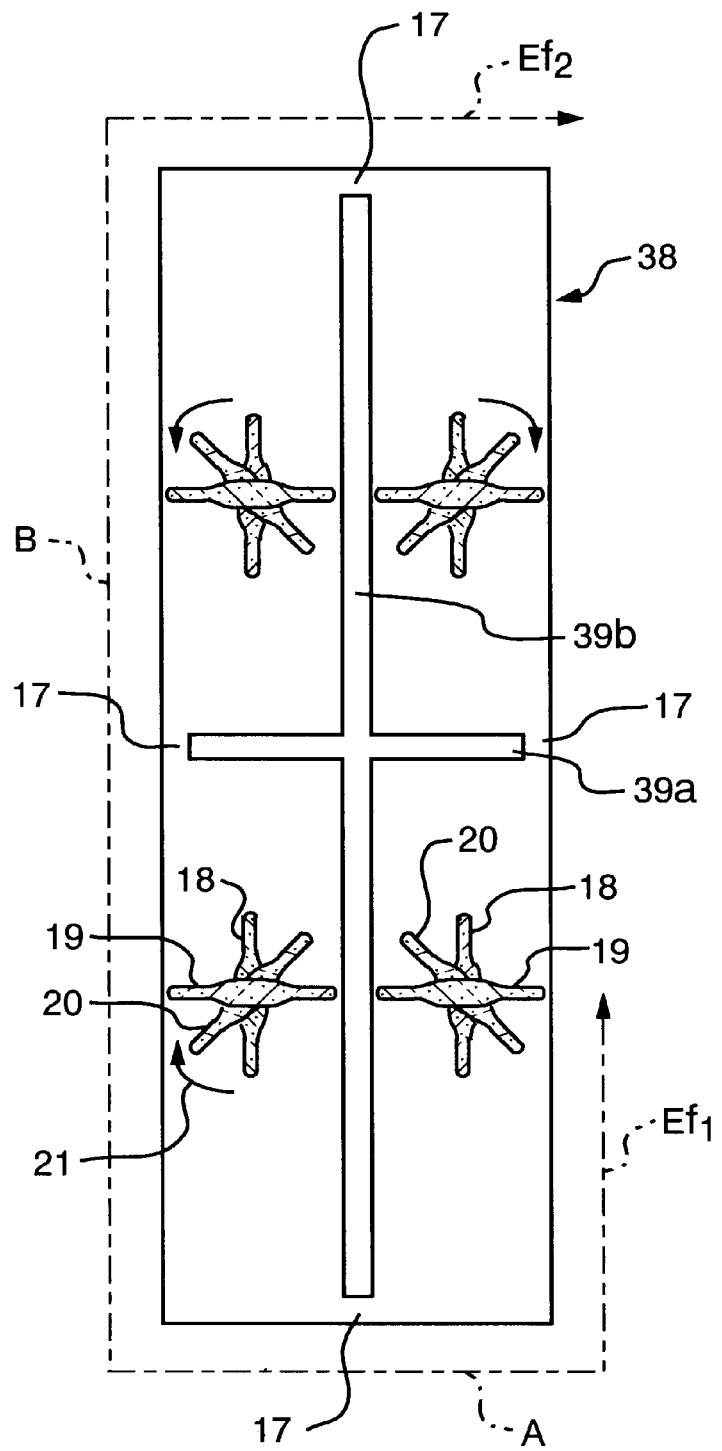
FIG. 5 is a plan view showing the state of orientation splitting of the liquid crystal display device of FIG. 4.

FIGS. 4 and 5 are plan views showing essential portions of the liquid crystal display device in a third embodiment of the present invention and a plan view showing the state of orientation splitting in the liquid crystal display device of FIG. 4, respectively. The technique underlying the orientation splitting in the present embodiment is similar to the technique explained with reference to FIG. 10.

Referring to FIG. 4, the pixel electrode 38 is provided with an opening (first opening) 39a and an opening (second opening) 39b crossing each other at a mid portion thereof to split the pixel electrode 38 in substantially four equal (rectangular) portions. End marginal portions of the openings 39a, 39b constitute electrically conductive portions 17 for electrically connecting the neighboring regions 38a to 38d to one another. As an underlying layer to these openings 38a to 38d, there is provided a control electrode 11 extending substantially to follow the contours of the openings 39a, 39b. The control electrode 11 associated with the opening 39a has its either ends extended slightly beyond the opening 39a in the left-and-right direction of FIG. 4 for operating as an interconnection for realizing electrical conduction to the control electrodes provided for other pixel electrodes, not shown, neighboring to the left-and right-side ends of the drawing. With this configuration, a process for separately forming the interconnection is eliminated to reduce the load on the manufacturing process.

By applying a pre-set voltage across the above-described control electrode 11, the splitting of the orientation as shown in FIG. 10 can be realized with the openings 39a, 39b as boundaries.

FIG. 5 shows the directions of the orientation of each liquid crystal molecules in the four regions obtained on orientation splitting. In each region, the directions of orientation of the liquid crystal molecules of each layer are indicated as the liquid crystal molecules of the mid layer, with the direction of distortion with respect to the upstanding direction of the liquid crystal molecule being indicated by an arrow 21.

By processing the orientation films 13, 14 on the substrates 31, 32 (FIG. 10) such as by rubbing, the liquid crystal molecules 18 on the pixel electrode side and the liquid crystal molecules 19 on the common electrode side are forced and controlled to be substantially perpendicular or parallel to the directions of transverse electrical fields Ef1, Ef2, as shown in FIG. 5. This sets the orientation of the liquid crystal molecules 18 on the pixel electrode side and that of the liquid crystal molecules 19 on the common electrode side so as to be subsequently perpendicular or parallel to the gate line 22 or the drain line 23 of the stitching element, while setting the direction of orientation of the liquid crystal molecules 18, 19 so as to be substantially perpendicular to each other.

Figure 6:
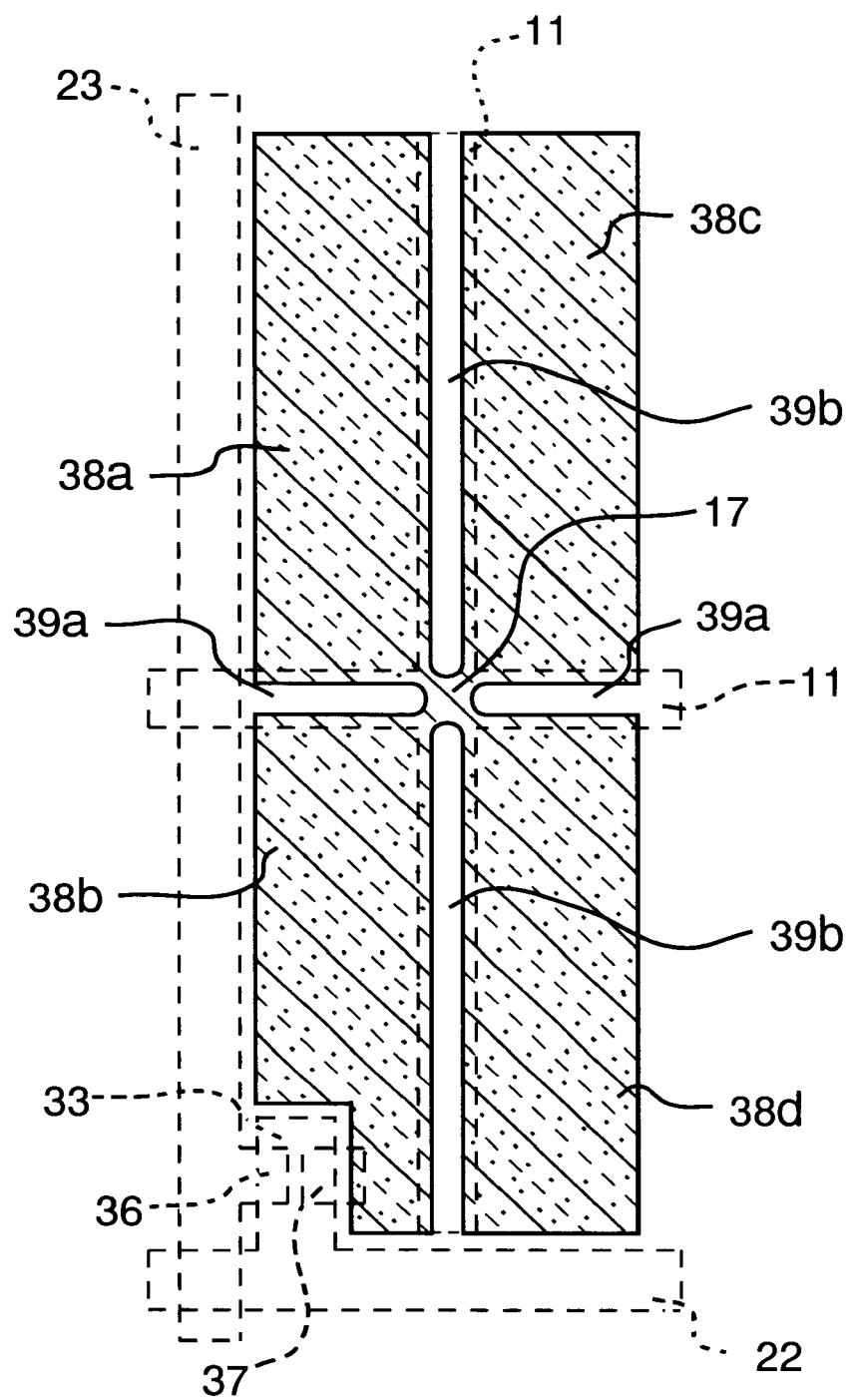
FIG. 6 is a plan view showing essential portions of a liquid crystal display device in the fourth embodiment and in the fourth Example of the present invention.
Figure 7:
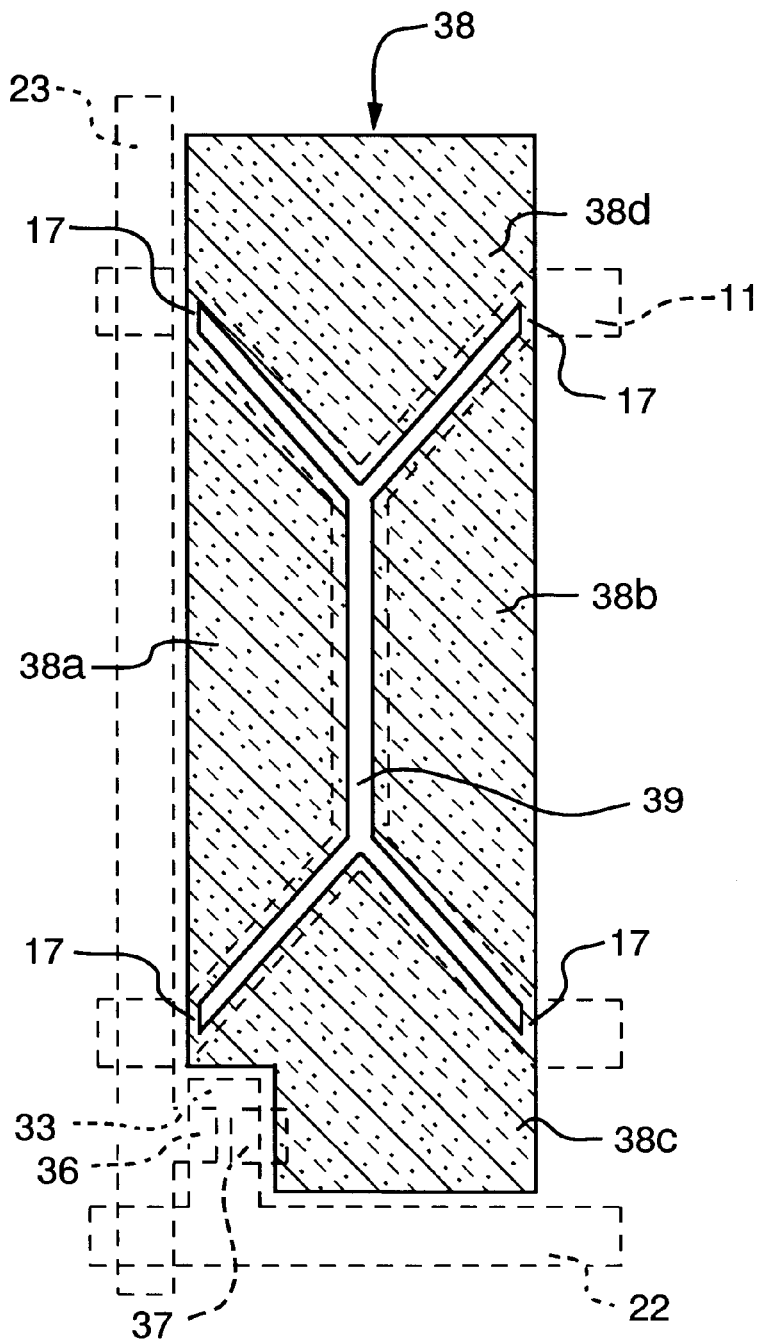
FIG. 7 is a plan view showing essential portions of the liquid crystal display device shown in FIG. 10. (Prior Art)
Figure 8:
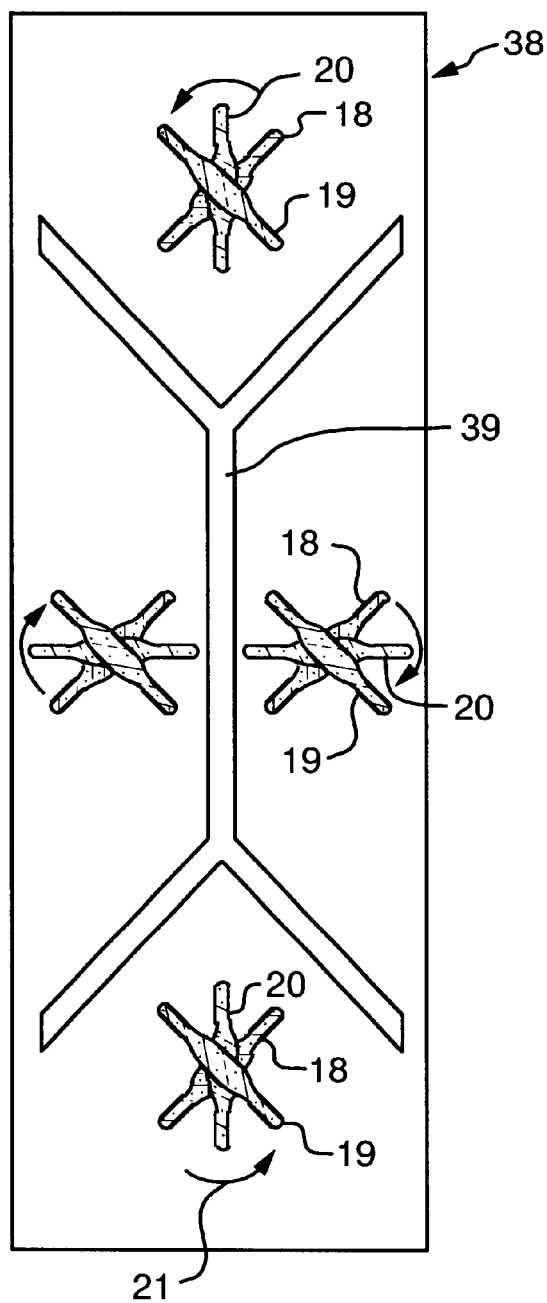
FIG. 8 is a plan view showing the state of orientation splitting of the liquid crystal display device of FIG. 7. (Prior Art)
Figure 9:
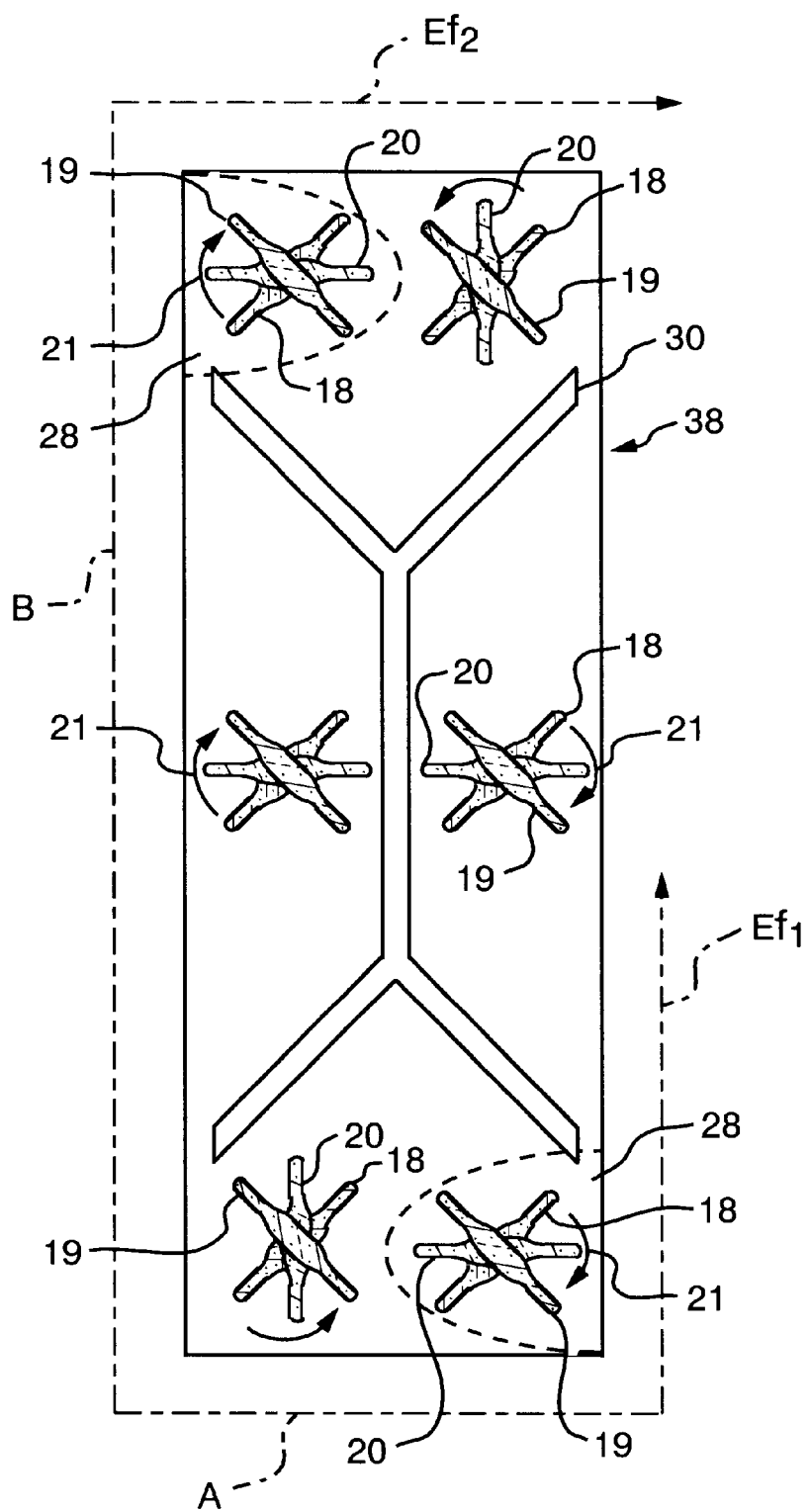
FIG. 9 is a plan view showing a defective orientation region on the liquid crystal display device of FIG. 7.

FIG. 6 is a plan view showing essential portion of the liquid crystal display device according to a fourth embodiment of the present invention. The principle underlying the orientation splitting in the present embodiment is also similar to that explained with reference to FIG. 10.

The electrically conductive portions 17 in the third embodiment are formed at the respective terminal portions of the openings 39a, 39b. In contrast, the sole electrically conductive portion 17 is formed at an intersection of the openings 39a, 39b in the present fourth embodiment. The present embodiment having this configuration also gives about the same effects as those of the third embodiment. In addition, the configuration corresponding to a combination of the present embodiment and the third embodiment, that is a configuration in which the electrically conductive portions 17 are formed in each of the end marginal portions of the openings 39a, 39b and at an intersection of the openings 39a, 39b, may also be used.

In the above-described first to fourth embodiments, it is possible to suppress the effects of transverse electrical fields from the gate lines 22 and the drain lines 23. The directions of the transverse electrical fields Ef1, Ef2 are the directions substantially perpendicular to a direction of extension A of the gate lines 22 and a direction of extension B of the drain lines 23. By these transverse electrical fields, there is applied a force which renders the direction of orientation of the liquid crystal molecules 20 of the intermediate layer parallel to that of the transverse electrical fields. In the conventional technique, minute domains with different directions of distortion are produced in the respective regions to render the splitting ratio of the respective pixels non-uniform to give rise to pixel-based fluctuations in the gradation observed mainly on changing the angle of view. However, in the first to fourth embodiments employing the inventive technique, there is no fear of the direction of distortion being changed with respect to the direction of orientation of the liquid crystal molecules 18 on the pixel electrode side and that of the liquid crystal molecules 19 on the common electrode side even if the direction of orientation of the liquid crystal molecules 20 of the intermediate layer is forced to be parallel to the direction of the transverse electrical fields. The result is that the splitting ratio of each pixel can be kept constant.

EXAMPLES

Example 1

A liquid crystal display device of the Example 1 is explained with reference to FIGS. 1, 2 and 10. This liquid crystal display device is manufactured in the following manner. First, there are formed, on a transparent substrate 31 of, for example, glass, a gate electrode 33, a control electrode 11 and a gate line 22, each formed as a sole layer or a multiple layer of metals, such as Cr or indium tin oxide (ITO), by sputtering and photoresist processes. As an overlying layer or layers, a gate insulating film 34 of a silicon nitride layer and a silicon oxide layer are constituted by CVD.

In addition, a semiconductor layer 35 formed of amorphous silicon (a-Si or n⁺a-Si) is formed as an overlying layer by CVD and a photoresist process, whilst a drain electrode 36, a source electrode 37 and a drain line 23, each formed as a sole layer or a multiple layer of metals such as Cr or ITO, are formed by sputtering and a photoresist process, respectively. By the above processes, the gate lines 22, drain lines 23 and switching elements arranged at the points of intersection are produced.

The pixel electrodes 38 made of transparent electrically conductive films of, for example, ITO, are then formed by sputtering and the photoresist process. Specifically, the openings 39, 10 are formed, and the control electrode 11 is arranged to lie below the opening 39. As an overlying layer, a passivating film 24, formed of silicon nitride, is formed by the CVD method and by the photoresist process.

The structure of a counter-substrate, arranged on the opposite side to the substrate 31, is explained. For color display, a color layer 25 is formed on a transparent substrate of, for example, glass. As an overlying layer, a transparent electrically conductive film, herein a common electrode 12 formed of ITO, is formed by sputtering. As uppermost layers of the substrates 31, 32, orientation layers 13, 14, comprised of organic films of polyimide etc, are formed, and subjected to orientation processing. Here, rubbing is carried out using a polyimide for horizontal orientation JALS-428 (trade name of a product by JSR). In the orientation films 13, 14, liquid crystal molecules are oriented in a direction perpendicular to the rubbing direction. Therefore, rubbing is carried out in a direction perpendicular to the direction of orientation of the liquid crystal molecules 18 on the pixel electrode side and that of the liquid crystal molecules 19 on the common electrode side shown in FIG. 2. The pre-tilt angles of the orientation films 13, 14 are almost 0°. The pre-tilt angle as close to 0° as possible is desirable because it affects the direction of orientation.

The substrates are arranged parallel to each other, with the oriented film surfaces facing each other, and a liquid crystal material is charged in-between. The liquid crystal material is constituted by the liquid crystal molecules 15, and a minor quantity of the UV curable monomers or oligomers. The liquid crystal material used may be such ones obtained on adding 1.0 wt % of a UV curable monomer KAYARAD PET-30 (trade name of a product manufactured by NIPPON KAYAKU KK), to ZLI-4792 (trade name of a product manufactured by MERCK) with a positive dielectric constant anisotropicity. An initiator, such as those containing 5 wt % of IRGANOX 907 (trade name) per monomers, may be added with reference to 100 wt % of the monomer.

If the voltage is applied across the control electrode 11, the direction of orientation of the liquid crystal molecules is split with the opening 39 as a boundary. Specifically, by applying a few tens of volt across the control electrode 11 and 0 volt across the common electrode 12, gate lines 22 and the drain lines 23, oblique electrical fields with different directions are generated with the opening 39 as the boundary to control the direction of orientation of the liquid crystal molecules 15. By irradiating UV rays from the side of t he substrate 31, UV curable monomers or oligomers are polymerized to produce a polymer 16. This polymer 16 has its configuration set in accordance with the direction of orientation of the liquid crystal molecules at the time of irradiation of UV rays, such that its configuration (three-dimensional orientation) is set even when no voltage is applied across the control electrode 11. Since the amount of the polymer 16 is small, the liquid crystal molecules are controlled only in its upstanding direction at the time of voltage application, with the tilt being changed in dependence upon the applied voltage. Therefore, there is no necessity of applying the voltage across the control electrode 11 at the time of driving such that display becomes possible only on voltage application across the pixel electrode 38.

On the outer lateral surfaces of the substrates 31, 32, optical films 26, 27 are stuck, respectively. The optical films 26, 27 are each constituted by a polarizing plate or by the combination of the polarizing plates and optical compensation films. The optical films 26, 27 are arranged so that light absorption axes of the polarizing plates stuck to the substrates 31, 32 cross each other at right angles. Here, the optical films 26, 27 are arranged at right angles to the rubbing direction of the substrates 31, 32.

In the present embodiment of the liquid crystal display device, gradation is displayed by changing the tilt of the liquid crystal molecules 15 for applying the voltage across the pixel electrode 38 for thereby changing the intensity of the transmitted light. The upstanding directions of the liquid crystal molecules differ from one orientation-split region to another due to the aforementioned regulation of the polymer configuration. Thus, there is no fear of the color tone differing with different angle of view as encountered when the direction of orientation is uniform in a display pixel, with the color tones of the respective regions compensating one another to give a display having a reduced extent of the angle of view dependency.

Although the provision of the openings (slits) is indispensable to control the orientation splitting by an oblique electrical field, the interconnection is necessary in order to establish electrical connection across the split pixel electrodes. The presence of the interconnection obliterates that of the openings and hence cannot control the direction of orientation of the liquid crystal molecules of the region in question in stability. Therefore, the presence of the interconnections tends to cause defective or non-optimum orientation. In the conventional technique, there are provided four electrically conducive portions 17. In the technique of the Example 1 of the present invention, there is provided only one electrically conductive portion 17, as shown in FIG. 1, thus assuring more effective suppression of non-optimum orientation.

It may be seen from the foregoing that the direction of orientation of the liquid crystal molecules can be regulated more stably with the technique of Example 1 of the present invention than with the conventional technique. The orientation splitting ratio can be maintained constant, as a result of which pixel-based fluctuations in the gradation mainly observed on changing the angle of view can be suppressed to realize desirable wide viewing angle characteristics.

Example 2

The structure of the present Example is explained with reference to the plan view of FIG. 4 and to the diagram of splitting of the orientation (plan view) of FIG. 5. With the present structure, relieved process loads and improved transmittance can be simultaneously achieved.

The present Example differs from Example 1 as to the structure of the pixel electrode, opening and the common electrode. The disposition of the orientation splitting differs with this structure. First, the openings 39a, 39b are arranged in a crisscross configuration, as shown in FIG. 4. In distinction from Example 1, the control electrode 11 is arranged as an underlying layer of the openings 39a, 39b. By the orientation splitting process similar to that of the Example 1, split regions shown in FIG. 5 is formed. For a sole region, produced on orientation splitting, there are an opening portion 39b, as a short side, and an opening 39b, as a long side, adjacent to each split region. In a direction synthesized from two oblique electrical fields, emanating from these two sides, the liquid crystal molecules are inclined, so that the twist direction is selected uniformly.

The direction of orientation of the liquid crystal molecules 18 on the pixel electrode side and that of the liquid crystal molecules 19 on the common electrode side are similar to those in Example 1. Thus, there is only little influence on the orientation by the transverse electrical fields, as in Example 1. The present embodiment has a merit that the interconnection to the control electrode 11 for the neighboring pixels can be simplified and that there is no light leakage at the boundary between the orientation split regions. There is no necessity of providing a separate interconnection for the control electrode 11, in distinction from the arrangement of Example 1, with the control electrode 11 itself serving as the interconnection. The sole control electrode 11 is effective to eliminate the load on the manufacturing process.

In the present embodiment, the direction of inclination of the liquid crystal molecules of each intermediate layer present in two neighboring regions is not contrary to each other, while the directions of distortion of the two regions being different from each other. In the boundary of these regions, no light leakage is produced. Thus, the control electrode 11 can be reduced in width to improve the transmittance.

In the abovementioned first and second embodiments and the first and second Examples, in which the liquid crystal molecules are oriented in the directions less susceptible to effects of the transverse electrical fields from the wiring lines, the electrode structure is suited to the orientation and in which the disposition of the wiring lines on the pixel electrodes possibly inducing non-optimum orientation is minimized, the direction of liquid crystal molecules can be controlled more stably. Moreover, the area ratio of the orientation split regions is not partialized (inbalanced) to specified areas, so that more uniform pixel splitting ratio can be achieved. Thus, the present invention can be applied to a large-sized display device in need of a wide angle of view.

Although the present invention has been explained in connection with preferred embodiments thereof, the present invention is not limited to the liquid crystal display device described in the above-described embodiments or Examples and encompasses a wide variety of modifications of the above-desribed embodiments or Examples.

The meritorious effect of the present invention are summarized as follows.

The above-described liquid crystal display device according to the present invention, in which it is possible to suppress pixel-based gradation fluctuations, such as is observed when the angle of view is changed, can be applied to a large-sized display device for which wide angle of view characteristics are required.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A liquid crystal display device in which a liquid crystal material having liquid crystal molecules is sealed between a pair of substrates, a plurality of pixel electrodes for applying a voltage across the liquid crystal material is disposed on one of the substrates, a common electrode for applying a common voltage across the liquid crystal material opposing the pixel electrodes is disposed on the other substrate, in which gate lines and drain lines of switching elements adapted to control the voltage to be applied across the pixel electrodes are provided extending substantially at right angles to each other, in which an orientation direction of the liquid crystal molecules neighboring to said pixel electrodes is perpendicular to that of liquid crystal molecules neighboring to said common electrode, and in which either of said orientation direction is substantially parallel to the extending direction of said gate line or that of said drain lines, wherein each of said pixel electrode is substantially in the form of a rectangle having a side substantially parallel to said gate lines and an another side substantially parallel to said drain lines, and wherein each of said pixel electrode has a first opening extending substantially parallel to said gate lines for splitting each of said pixel electrodes into two split regions with respect to the direction of extension of said drain lines and second and third openings extending from the vicinity of an end of said first opening opposite to the drain lines at a pre-set inclination towards said drain lines for further splitting each of the two split regions into two.

2. The liquid crystal display device as defined in claim 1 wherein there is provided an electrically conductive portion in an area where the ends of said first to third openings are close to one another, said electrically conductive portion electrically connecting regions split by said openings to one another.

3. The liquid crystal display device as defined in claim 1 wherein there is further provided a control electrode extending along each of said second and third openings.

4. The liquid crystal display device as defined in claim 2 wherein there is further provided a control electrode extending along each of said second and third openings.

5. A liquid crystal display device in which a liquid crystal material having liquid crystal molecules is sealed between a pair of substrates, a plurality of pixel electrodes for applying a voltage across the liquid crystal material is disposed on one of the substrates, a common electrode for applying a common voltage across the liquid crystal material opposing the pixel electrodes is disposed on the other substrate, in which gate lines and drain lines of switching elements adapted to control the voltage to be applied across the pixel electrodes are provided extending substantially at right angles to each other, in which an orientation direction of the liquid crystal molecules neighboring to said pixel electrodes is perpendicular to that of liquid crystal molecules neighboring to said common electrode, and in which either of said orientation directions is substantially parallel to the extending direction of said gate lines or that of said drain lines, wherein each of said pixel electrodes is substantially in the form of a rectangle having a side substantially parallel to said gate lines and an another side substantially parallel to said drain lines, and wherein each of said pixel electrodes has a first opening extending substantially parallel to said gate lines for splitting each of said pixel electrodes into two split regions with respect to the direction of extension of said drain lines and second and third openings extending from the vicinity of an end of said first opening for further splitting each of the two split regions into two.

6. The liquid crystal display device as defined in claim 5 wherein there is provided an electrically conductive portion in an area where the ends of said first to third openings are close to one another, said electrically conductive portion electrically connecting regions split by said openings to one another.

7. The liquid crystal display device as defined in claim 5 wherein there is further provided a control electrode extending along each of said second and third openings.

8. The liquid crystal display device as defined in claim 6 wherein there is further provided a control electrode extending along each of said second and third openings.

* * * * *